W. C. Bibb,
Rotary Cultivator.

No. 112,209.        Patented Feb. 28, 1871.

Witnesses:
Albert E. Andrews.
Charles H. Andrews.

Inventor.
William C. Bibb.

UNITED STATES PATENT OFFICE.

WILLIAM C. BIBB, OF MADISON, GEORGIA.

IMPROVEMENT IN COMBINED COTTON CHOPPERS, SCRAPERS, &c.

Specification forming part of Letters Patent No. 112,209, dated February 28, 1871.

*To all whom it may concern:*

Be it known that I, WILLIAM C. BIBB, of the city of Madison, in the county of Morgan and State of Georgia, have invented certain improvements in machinery for the purpose of chopping out cotton and cultivating the same with plows at one and the same operation, of which the following is a specification.

Figure 2:
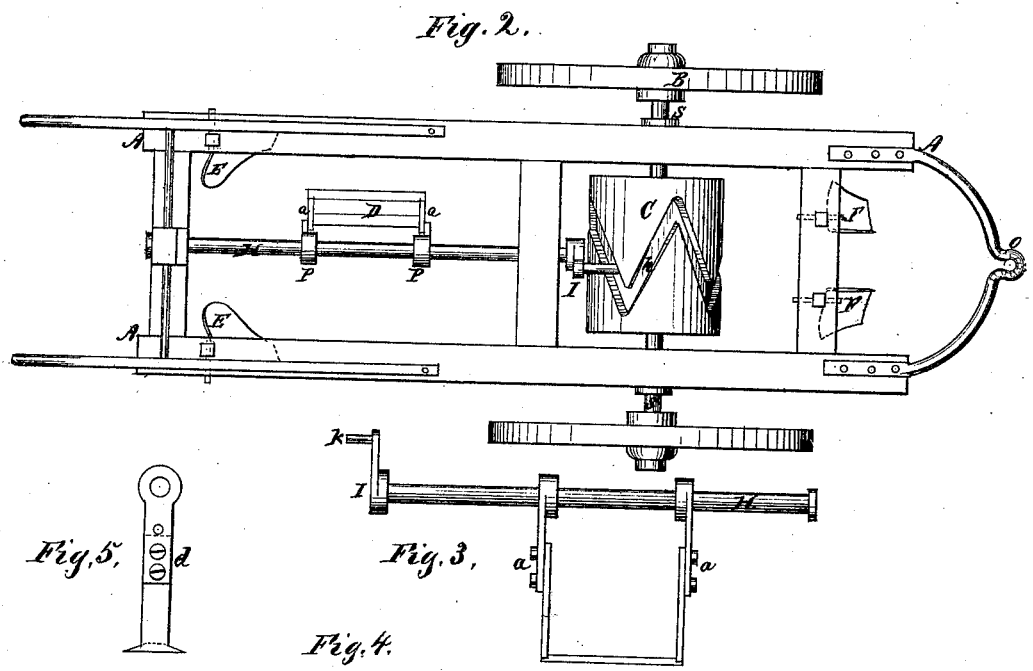

The first part of my invention is the attachment of a slotted wheel, C C, Figure 2, firmly to the axle-tree S S, on which there are securely fastened the wheels B B, so that they will turn together as the machine is moved forward, and thus furnish the motive power for driving the movable parts of the machine.

The second part of my invention is a shaft, H, with a crank, I, on the wrist of which is the roller K, to relieve the friction as it plays in the slot $y\,y$ of the wheel C C. This slot gives to the crank a semicircular movement.

Figure 3:
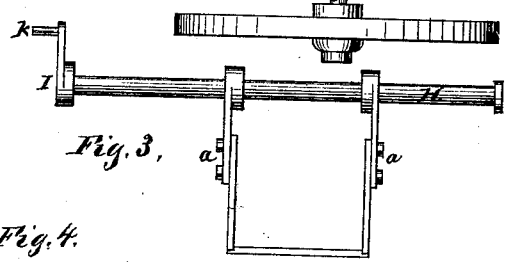

The third part of my invention is a hoe, D, Fig. 2, which is two-edged, and is attached to the shaft H by means of hangers, as indicated in Fig. 3, and which may be lowered or elevated by means of pins or bolts, as in Fig. 3, $a\,a$, and receives, by means of the slotted wheel C C and crank I through the shaft H, a motion across the row of cotton from one side to the other alternately, and is so spaced as to cut out the cotton at each stroke across. The space between the cuts of the hoe is regulated by the width of the hoe and the number of angles in the slot $y\,y$.

Figure 1:
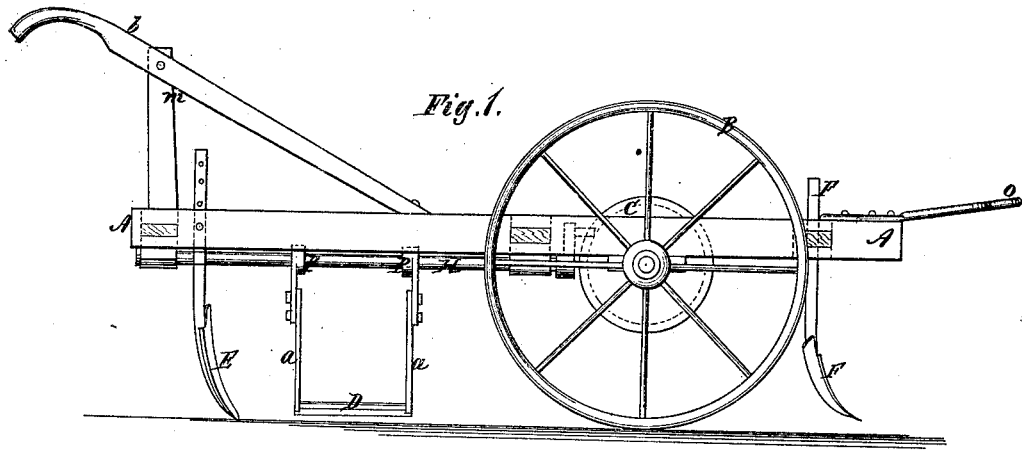

The fourth part of my invention is the application of two plows or scrapers, F F, Fig. 1, in front of the hoe, having their edges next to the young cotton turned forward, so that the dirt is prevented from falling on and covering up the plants. These scrapers are intended to cut up the weeds, grass, or other pests on either side of the row of cotton, and leave it in good condition to be chopped out, and have the dirt returned by another set of plows, E E, attached behind the hoe, and leave the crop in good growing condition. These plows are raised or lowered by pins also.

Figure 5:
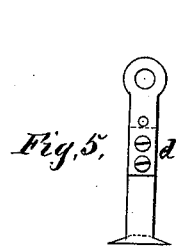
Figure 4:
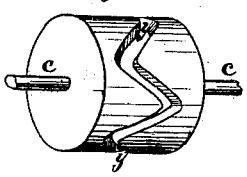

In the accompanying drawings, Fig. 1 is a side elevation of a cotton chopper and cultivator and scraper with my improvements embodying my invention. Fig. 2 is an elevation, showing a top view. Fig. 3 is a view of the shaft, crank, and roller, hoe and its attachments. Fig. 4 is a view of the slotted wheel. Fig. 5 is an end view of the hoe and attachment.

I claim—

The arrangement of the hoe D, operated as described, with the adjustable scrapers F and adjustable plows E, substantially as and for the purpose set forth.

WILLIAM C. BIBB.

Witnesses:
C. C. HAMMOCK,
W. P. CHISOLM.